United States Patent [19]

Röck et al.

[11] Patent Number: 4,832,420
[45] Date of Patent: May 23, 1989

[54] FASTENING DEVICE FOR ADJUSTABLE FRONT PLATES OF DRAWERS

[75] Inventors: Erich Röck, Höchst; Klaus Brüstle, Lauterach, both of Austria

[73] Assignee: Julius Blum Gesellslchaft m.b.H., Höchst, Austria

[21] Appl. No.: 148,350

[22] Filed: Jan. 25, 1988

[30] Foreign Application Priority Data

Feb. 4, 1987 [AT] Austria ................................ 219/87

[51] Int. Cl.⁴ .............................................. A47B 48/00
[52] U.S. Cl. ................................ 312/263; 312/330 R; 403/246
[58] Field of Search ................ 403/245, 246, 231; 312/257 R, 330 R, 263, 140

[56] References Cited

U.S. PATENT DOCUMENTS

| 2,874,388 | 2/1959 | Edelen, Sr. |
| 4,264,113 | 4/1981 | Suttles ................................ 312/263 |
| 4,458,965 | 7/1984 | Ohlendorf et al. |
| 4,502,807 | 3/1985 | Salice |
| 4,507,010 | 3/1985 | Fujiya |
| 4,520,608 | 6/1985 | Baus |
| 4,609,236 | 9/1986 | Twellmann ................ 312/330 R |
| 4,649,712 | 3/1987 | Tate, Jr. et al. |
| 4,690,469 | 9/1987 | Grass |
| 4,705,328 | 11/1987 | Röck et al. |
| 4,741,583 | 5/1988 | Rock et al. ................ 312/330 R |

FOREIGN PATENT DOCUMENTS

| 96898 | 12/1983 | European Pat. Off. |
| 160733 | 11/1985 | European Pat. Off. |
| 3148066 | 10/1982 | Fed. Rep. of Germany |

Primary Examiner—Joseph Falk
Attorney, Agent, or Firm—Wenderoth, Lind & Ponack

[57] ABSTRACT

A fastening device for connecting an adjustable front plate of a drawer to a drawer side wall at each of opposite sides of a drawer includes a holding part fastened to the front plate and engageable in a supporting part fastened to the drawer side wall. A holding member engages a hook member of the corresponding holding part and includes a clamping hook which is mounted on the supporting part. The clamping hook is clampable by a screw and pulls the holding part and front plate toward the drawer side wall.

12 Claims, 2 Drawing Sheets

FASTENING DEVICE FOR ADJUSTABLE FRONT PLATES OF DRAWERS

FIELD AND BACKGROUND OF THE INVENTION

The invention relates to a fastening device for connecting each side of an adjustable front plate of a drawer to a side wall of the drawer, a supporting member being fastened to each drawer side wall and the front plate being fastened by means of screws or dowels to holding parts which are engageable in the supporting members, and further at each side of the drawer therebeing a holding means which engages a hook member of the corresponding holding part and comprises a clamping hook which pulls the hook member and thus the holding part and the front plate toward the drawer side wall.

A fastening device of the afore-mentioned type is disclosed, for example, in DE-A No. 31 48 066. By means of a fastening device of this kind the front plate can be quickly anchored to the drawer side walls when the drawer parts are assembled, and it is further possible to adjust the position of the front plate so that equal vertical and horizontal gaps are obtained between several drawers.

Lately, an increasing number of drawers with double side walls have been put on the market. The drawer side walls may be of plastic material or of metal. In the latter case, they often also fulfill the function of a pull-out rail of a guide assembly.

SUMMARY OF THE INVENTION

It is the object of the invention to provide a fastening device of the above-mentioned kind which is particularly suitable for use with drawer side walls of the aforementioned kind and which permits particularly quick and secure anchoring of the front plate and preferably a vertical adjustment of the same.

According to the invention this is achieved by providing that the clamping hook is laterally pressed toward the hook member of the holding part by mean of a screw which is mounted in the support or supporting members.

For mounting the front plate, the holding parts need only be pushed into the side walls. When the front plate has been adjusted laterally and vertically, the clamping hooks are laterally pressed toward the supporting members by means of tightening the screws, and the front plate thus is pressed toward the drawer side walls.

Lateral adjustability of the front plate is advantageously obtained in that each holding part is made of two members that are slidable relative to each other, and that a clamping element is arranged between the two parts to clamp the two parts together.

An embodiment of the invention provides that the clamping hooks and the hook members of the holding parts have inclined engaging surfaces.

A further embodiment of the invention provides that an eccentric for the vertical adjustment of the holding part is arranged on the supporting member. Thus, vertical adjustment of the holding part and also of the front plate is obtained in this manner.

A particularly good connection of the two members which form a holding part is obtained in that one of the two parts has a T-shaped shoulder or projection which is guided in a correspondingly shaped recess of the other part. This also provides good guiding of the front plate during lateral displacement thereof.

Quick mounting of the front plate is obtained in that in the region of the hook members with which the clamping hooks engage, the holding parts are provided with wedge surfaces.

BRIEF DESCRIPTION OF THE DRAWINGS

In the following an embodiment of the invention will be described in more detail with reference to the accompanying drawings without being limited thereto, and wherein.

DESCRIPTION OF THE PREFERRED EMBODIMENT

Figure 1:
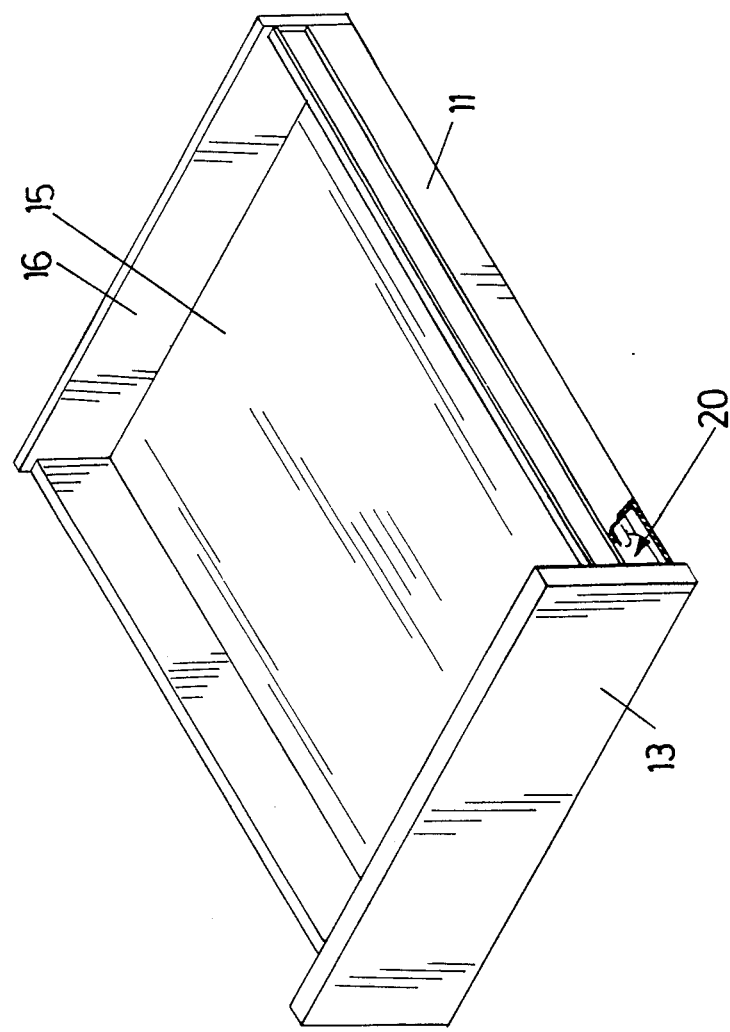
FIG. 1 is a perspective view of a drawer with a fastening device for a front plate according to the invention.
Figure 2:
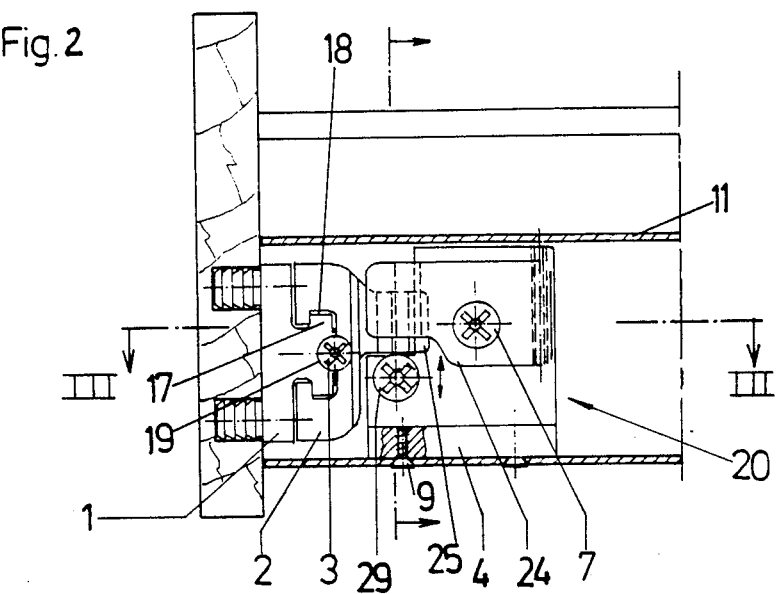
FIG. 2 is a longitudinal sectional view of the front region of the drawer side wall and showing the fastening device according to the invention.
Figure 3:
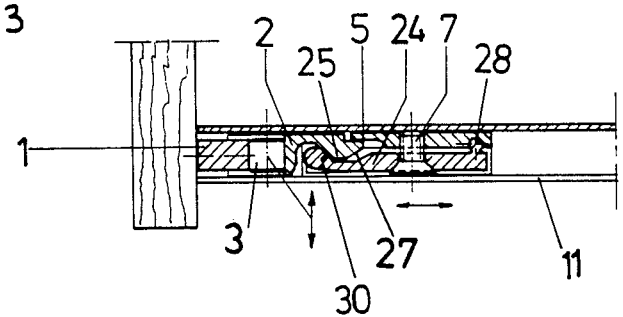
FIG. 3 is a horizontal sectional view through line III—III of FIG. 2.
Figure 4:
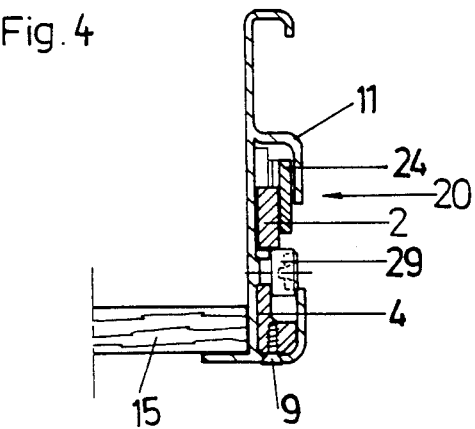
FIG. 4 is a vertical sectional view of the fastening device according to the invention.

The essential parts of a drawer are two drawer side walls 11, front plate 13, drawer bottom 15 and rear wall 16. A fastening device 20 according to the invention is fitted to the front side of each drawer side wall 11.

Holding parts are fastened to each side of the front plate 13. The holding parts comprise two members 1 and 2, member 1 being directly fastened to the front plate and member 2 being held on or fastened to member 1. Member 1 has a T-shaped shoulder or projection 17 which is guided in a correspondingly shaped groove 18 in member 2. Hence, when the front plate 13 is in a preliminary mounted position, the front plate and members 1 are laterally displaceable relative to the parts 2.

An eccentric 3 is arranged between the respective members 1 and 2 in recesses 19 formed therein. After lateral adjustment, the eccentric 3 is turned and thereby tightened so that members 1, 2 are fixed in respect to each other.

The outer wall of each drawer side wall 11 has an opening through which an adjusting tool has access to the eccentric 3 and to an eccentric 29 and a screw 7, to be discussed below.

The holding parts 1, 2 of the fastening devices 20 are pushed into front ends of the respective drawer side walls 11. When each holding part 1, 2 is pushed into the respective side wall 11, a hook member 25 of member 2 engages behind a clamping hook 24. The front plate 13 is thus preliminarily held or mounted on the drawer side walls 11.

The possibility of laterally adusting the front plate 13 by displacing the members 1 with respect to the members 2 has been described.

The hook member 25 of the member 2 extends laterally behind the clamping hook 24. The clamping hook 24 is mounted on a support or supporting member 4 by means of a joint 28 and by screw 7. The support 4 is connected to the side wall 11 by means of one screw 9 or a number of screws 9.

An eccentric 29 for the vertical adjustment of the front plate 13 is mounted in the support 4. The hook member 25 rests directly on the eccentric 29. As long as the screw 7 is not tightened, hook member 25 and thus front plate 13 can be lifted or lowered by turning the eccentric 29.

Hook member 25 and clamping hook 24 are provided with complementary inclined engaging surfaces 30. When screw 7 is tightened, the holding part 1, 2 is pulled into the drawer side wall 11 by means of the hook member 25 because of the wedge effect of the engaging surfaces 30, and the front plate 13 is pressed against the front side or end of the side wall. A tip 5 of the hook member 25 rests laterally against the support 4. Hook member 25 has a wedge surface 27 which facilitates movement of hook member 25 past the hook 4 when the holding member 2 is pushed into the drawer side wall 11.

What is claimed is:

1. A fastening device for use in adjustably mounting each of opposite sides of a front plate of a drawer to a respective side wall of the drawer, said fastening device comprising:
    a supporting member to be fastened to a respective side wall of the drawer;
    a holding member mounted on said supporting member and having a clamping hook;
    a holding part to be fastened to a respective side of the front plate, said holding part having a hook member to be engaged by said clamping hook of said holding means upon said holding part being inserted into the drawer side wall and thus supporting the front plate in an initially fastened position, with said hook member and said clamping hook being positioned relatively laterally of each other in said initially supported position, and said holding part having in the region of said hook member a wedge surface for facilitating sliding of said hook member past said clamping hook during said inserting;
    tightening means, operatively associated with said supporting member and said holding member, for, upon tightening of said tightening means, moving said holding member laterally toward said supporting member; and
    said holding member and said holding part having means for, upon said tightening means moving said holding member toward said supporting member, moving said holding part and thereby the front plate toward the drawer side wall to a final fastened position.

2. A device as claimed in claim 1, wherein said moving means of said holding member and said holding part comprise engaging inclined surfaces on said hook member and said clamping hook.

3. A device as claimed in claim 1, further comprising means on said supporting member for moving said holding part and thus the front plate vertically upwardly or downwardly.

4. A device as claimed in claim 3, wherein said vertically moving means comprises an eccentric rotatably mounted on said supporting member and engaged by said holding part.

5. A device as claimed in claim 1, wherein said holding part comprises first and second members slidably engaged with each other.

6. A device as claimed in claim 5, wherein said first part has a T-shaped protrusion slidably fitting into a correspondingly shaped recess in said second part.

7. A device as claimed in claim 5, wherein said first and second parts are slidable relative to each other in opposite lateral directions.

8. A device as claimed in claim 5, further comprising clamping means for fixing the relative position between said first and second parts.

9. A device as claimed in claim 8, wherein said clamping means comprises an eccentric mounted in facing recesses in said first and second parts.

10. A device as claimed in claim 9, wherein said recesses together form a cylinder.

11. A device as claimed in claim 1, wherein said hook member is positioned laterally of said supporting member and is pressed theretoward by said clamping hook upon said tightening means being tightened.

12. A device as claimed in claim 1, wherein said tightening means comprises a screw extending through said supporting member and threaded into said holding member.

* * * * *